US012202270B2

(12) United States Patent
Iwata et al.

(10) Patent No.: US 12,202,270 B2
(45) Date of Patent: Jan. 21, 2025

(54) LIQUID EJECTING APPARATUS

(71) Applicant: SEIKO EPSON CORPORATION, Tokyo (JP)

(72) Inventors: Takeshi Iwata, Shiojiri (JP); Kazutoshi Shimizu, Shimosuwa-machi (JP); Atsushi Yoshida, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 124 days.

(21) Appl. No.: 18/058,974

(22) Filed: Nov. 28, 2022

(65) Prior Publication Data

US 2023/0173811 A1 Jun. 8, 2023

(30) Foreign Application Priority Data

Nov. 29, 2021 (JP) ................................ 2021-193328

(51) Int. Cl.
*B41J 2/175* (2006.01)

(52) U.S. Cl.
CPC .................................... *B41J 2/175* (2013.01)

(58) Field of Classification Search
CPC .... B41J 2/175; B41J 2/17509; B41J 2/17513; B41J 2/1752; B41J 2/17523; B41J 2/17546; B41J 2/17553; B41J 2/17566; B41J 29/13; B41J 29/38
See application file for complete search history.

(56) References Cited

U.S. PATENT DOCUMENTS

2009/0201347 A1 8/2009 Hamano
2019/0111697 A1* 4/2019 Koganehira ......... B41J 2/17509
2020/0079093 A1 3/2020 Sato et al.

FOREIGN PATENT DOCUMENTS

JP H11-138850 A 5/1999
JP 2004-203056 A 7/2004
JP 2009-184233 A 8/2009
JP 2020-082370 A 6/2020

* cited by examiner

*Primary Examiner* — Justin Seo
*Assistant Examiner* — Tracey M McMillion
(74) *Attorney, Agent, or Firm* — WORKMAN NYDEGGER

(57) ABSTRACT

A liquid ejecting apparatus includes a head, a first holder to which a main tank is attached, a second holder to which a sub tank is attached, a supply channel coupled to the head and the first holder, a branch channel that branches off at an intermediate point in the supply channel and that is coupled to the second holder, and a controller. Each of the main tank and the sub tank is a liquid container including a container and a memory circuit. The first holder includes a connector. The controller updates, via the connector, remaining amount information stored in the memory circuit of the main tank, performs an operational control based on the remaining amount information stored in the memory circuit of the main tank, and does not perform the operational control based on the remaining amount information stored in the memory circuit of the sub tank.

7 Claims, 3 Drawing Sheets

FIG. 3

| MAIN TANK | SUB TANK | SUPPLY OPERATION |
|---|---|---|
| LIQUID REMAINING | LIQUID REMAINING AND ELAPSED TIME ≤ PREDETERMINED TIME | MAIN TANK → HEAD |
| LIQUID REMAINING | LIQUID REMAINING AND ELAPSED TIME > PREDETERMINED TIME | SUB TANK → HEAD |
| LIQUID REMAINING | NO LIQUID REMAINING | MAIN TANK → HEAD OR MAIN TANK → SUB TANK |
| NO LIQUID REMAINING | LIQUID REMAINING | SUB TANK → HEAD |

LIQUID EJECTING APPARATUS

The present application is based on, and claims priority from JP Application Serial Number 2021-193328, filed Nov. 29, 2021, the disclosure of which is hereby incorporated by reference herein in its entirety.

BACKGROUND

1. Technical Field

The present disclosure relates to a liquid ejecting apparatus.

2. Related Art

JP-A-2020-082370 describes a liquid ejecting apparatus including a head that ejects a liquid and a channel coupled to a main tank, a sub tank, and the head. In this liquid ejecting apparatus, the liquid is supplied, via the channel, from the main tank to the sub tank and from the sub tank to the head. The main tank of the liquid ejecting apparatus is replaced when the remaining amount of the liquid contained in the main tank becomes zero or notably small.

In the liquid ejecting apparatus described in JP-A-2020-082370, although the main tank is replaceable, replacement of the sub tank is not considered. Therefore, the sub tank is more likely to degrade than the main tank. As the sub tank degrades, the possibility of a failure of the liquid ejecting apparatus increases.

SUMMARY

According to an aspect of the present disclosure, a liquid ejecting apparatus includes a head that ejects a liquid, a first holder to which a main tank is attached, a second holder to which a sub tank is attached, a supply channel coupled to the head and the first holder, a branch channel that branches off at an intermediate point in the supply channel and that is coupled to the second holder, and a controller. Each of the main tank and the sub tank is a liquid container including a container that contains a liquid and a memory circuit that stores remaining amount information of the liquid. The first holder includes a connector coupled to the memory circuit of the main tank. The controller updates, via the connector, the remaining amount information stored in the memory circuit of the main tank in accordance with the amount of the liquid flowed out of the main tank, performs operational control based on the remaining amount information stored in the memory circuit of the main tank, and does not perform the operational control based on the remaining amount information stored in the memory circuit of the sub tank.

BRIEF DESCRIPTION OF THE DRAWINGS

FIG. 3 is a table indicating examples of supply operations.

DESCRIPTION OF EXEMPLARY EMBODIMENTS

An embodiment of a liquid ejecting apparatus is described below with reference to the accompanying drawings. The liquid ejecting apparatus is, for example, an ink jet printer that records characters and images, such as photographs, by ejecting ink, which is an example of a liquid, onto media, such as paper and cloth.

Figure 1:
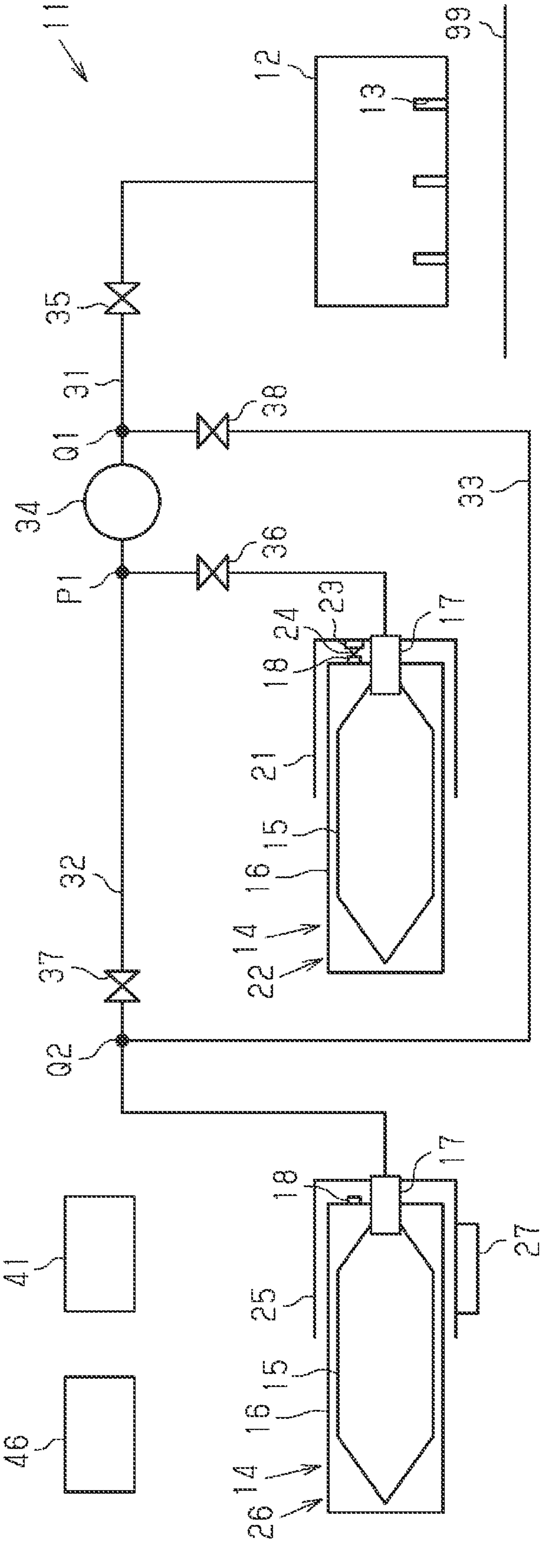
FIG. 1 is a schematic diagram illustrating an embodiment of a liquid ejecting apparatus.

As illustrated in FIG. 1, a liquid ejecting apparatus 11 includes a head 12. The head 12 is configured to eject a liquid. The head 12 includes nozzles 13. The head 12 ejects the liquid from the nozzles 13. The head 12 records an image on a medium 99 by ejecting the liquid onto the medium 99. The head 12 is supplied with the liquid from multiple liquid containers 14 attached to the liquid ejecting apparatus 11.

Each liquid container 14 includes a container 15. The container 15 is configured to contain the liquid. The container 15 is, for example, a pack for containing the liquid. The container 15 may also be a case for containing the liquid. That is, the container 15 may be a closed system in which the contained liquid is not exposed to the atmosphere or may be an open system in which the contained liquid is exposed to the atmosphere.

The liquid container 14 includes a housing 16. The housing 16 houses the container 15. The housing 16 houses the container 15 to protect the container 15.

The liquid container 14 includes an outlet 17. The outlet 17 is coupled to the container 15. The liquid contained in the container 15 is output through the outlet 17.

The liquid container 14 includes a memory circuit 18. The memory circuit 18 is attached to, for example, the housing 16. The memory circuit 18 stores remaining amount information indicating the remaining amount of the liquid contained in the liquid container 14, that is, the remaining amount of the liquid contained in the container 15. The memory circuit 18 of an unused liquid container 14 stores, as the remaining amount information, the maximum amount of liquid that the container 15 can contain.

The liquid ejecting apparatus 11 includes a first holder 21. The first holder 21 is configured to hold a main tank 22. The main tank 22 is the liquid container 14. That is, the liquid container 14 is attached as the main tank 22 to the first holder 21. The liquid container 14 attached to the first holder 21 is replaceable.

The first holder 21 includes a connector 23. The connector 23 is coupled to the memory circuit 18 of the liquid container 14 attached to the first holder 21. That is, the connector 23 is coupled to the memory circuit 18 of the main tank 22. When the liquid container 14 is attached to the first holder 21, the memory circuit 18 of the liquid container 14 is coupled to the connector 23.

In this example, the connector 23 includes a terminal 24. The terminal 24 comes into contact with the memory circuit 18 of the liquid container 14 attached to the first holder 21. That is, the terminal 24 comes into contact with the memory circuit 18 of the main tank 22. For example, the terminal 24 comes into contact with a contact of the memory circuit 18. When the liquid container 14 is attached to the first holder 21, the terminal 24 comes into contact with the memory circuit 18 of the liquid container 14. When the terminal 24 comes into contact with the memory circuit 18, the connector 23 is coupled to the memory circuit 18.

The connector 23 may be configured to be coupled to the memory circuit 18 without being in physical contact with the memory circuit 18. For example, the connector 23 may be wirelessly coupled to the memory circuit 18. In this case, the memory circuit 18 includes, for example, an RF tag, and the connector 23 is, for example, a reader/writer that communicates with the RF tag.

The liquid ejecting apparatus 11 includes a second holder 25. The second holder 25 is configured to hold a sub tank 26. The sub tank 26 is a liquid container 14. That is, the liquid container 14 is attached as the sub tank 26 to the second holder 25. The liquid container 14 attached to the second holder 25 is replaceable. In this example, unlike the first holder 21, the second holder 25 does not include the connector 23. Therefore, in this example, the second holder 25 does not communicate with the memory circuit 18 of the sub tank 26.

Although the liquid container 14 attached to the first holder 21 and the liquid container 14 attached to the second holder 25 have the same reference number, the two liquid containers 14 do not necessarily have an identical configuration or identical functions. For example, the liquid container 14 for the first holder 21 may be referred to as a first liquid container, and the liquid container 14 for the second holder 25 may be referred to as a second liquid container. The first liquid container and the second liquid container need only be compatible with the first holder 21 and the second holder 25, respectively. For example, the first liquid container may also be usable as the sub tank 26. For example, the second liquid container may also be usable as the main tank 22. Accordingly, for example, the amounts of liquid containable by the containers 15 of the first liquid container and the second liquid container and the shapes of the containers 15 may differ from each other. Each of the first liquid container and the second liquid container need only include the container 15 and the memory circuit 18.

The liquid ejecting apparatus 11 includes a detector 27. The detector 27 is, for example, attached to the second holder 25. The detector 27 is configured to detect the remaining amount of liquid contained in the liquid container 14, that is, the sub tank 26, attached to the second holder 25. The detector 27 is, for example, a mass sensor. The detector 27 detects the remaining amount of liquid contained in the sub tank 26 by detecting the weight of the sub tank 26. With this configuration, the liquid ejecting apparatus 11 manages the remaining amount of liquid in the sub tank 26.

The detector 27 is not necessarily configured to detect the weight of the sub tank 26. For example, the detector 27 may be configured to detect the remaining amount of liquid contained in the sub tank 26 by detecting the pressure in a channel coupled to the sub tank 26. Also, the detector 27 may detect the remaining amount of liquid contained in the sub tank 26 by, for example, detecting the liquid level in the sub tank 26. Methods for detecting the liquid level in the sub tank 26 include a method using an electrode and a method using a prism.

The liquid ejecting apparatus 11 includes a supply channel 31. The supply channel 31 is coupled to the first holder 21 and the head 12. One end of the supply channel 31 is coupled to the first holder 21. Another end of the supply channel 31 is coupled to the head 12. When the liquid container 14 is attached to the first holder 21, the liquid container 14 is coupled to the supply channel 31. The liquid is supplied from the main tank 22 to the head 12 via the supply channel 31.

The liquid ejecting apparatus 11 includes a branch channel 32. The branch channel 32 branches off at an intermediate point in the supply channel 31. The branch channel 32 branches off at a branch point P1 in the supply channel 31. The branch channel 32 is coupled to the second holder 25.

One end of the branch channel 32 is coupled to the supply channel 31. The one end of the branch channel 32 is located at the branch point P1. Another end of the branch channel 32 is coupled to the second holder 25. When the liquid container 14 is attached to the second holder 25, the liquid container 14 is coupled to the branch channel 32. The liquid is supplied from the sub tank 26 to the head 12 via the branch channel 32 and the supply channel 31.

The liquid ejecting apparatus 11 includes a circulation channel 33. The circulation channel 33 is coupled to the supply channel 31 and the branch channel 32. The circulation channel 33 is coupled to the supply channel 31 at a first connection point Q1. The first connection point Q1 is located in the supply channel 31 between the branch point P1 and the head 12. The circulation channel 33 is coupled to the branch channel 32 at a second connection point Q2.

One end of the circulation channel 33 is coupled to the supply channel 31. The one end of the circulation channel 33 is located at the first connection point Q1. Another end of the circulation channel 33 is coupled to the branch channel 32. The other end of the circulation channel 33 is located at the second connection point Q2. The liquid can be circulated through the supply channel 31, the branch channel 32, and the circulation channel 33.

The liquid ejecting apparatus 11 includes a supply pump 34. The supply pump 34 supplies the liquid to the head 12. The supply pump 34 is, for example, a diaphragm pump. The supply pump 34 may also be any other type of pump, such as a tube pump. The supply pump 34 is located in the supply channel 31. Specifically, the supply pump 34 is located in the supply channel 31 between the branch point P1 and the first connection point Q1.

The liquid ejecting apparatus 11 includes multiple valves. For example, the liquid ejecting apparatus 11 includes a head valve 35, a supply valve 36, a branch valve 37, and a circulation valve 38. Each of the head valve 35, the supply valve 36, the branch valve 37, and the circulation valve 38 is, for example, an on-off valve.

The head valve 35 is located in the supply channel 31. Specifically, the head valve 35 is located in the supply channel 31 between the first connection point Q1 and the head 12.

The supply valve 36 is located in the supply channel 31. Specifically, the supply valve 36 is located in the supply channel 31 between the branch point P1 and the first holder 21.

The branch valve 37 is located in the branch channel 32. Specifically, the branch valve 37 is located in the branch channel 32 between the branch point P1 and the second connection point Q2.

The circulation valve 38 is located in the circulation channel 33.

The liquid ejecting apparatus 11 includes a controller 41. The controller 41 controls various components of the liquid ejecting apparatus 11. The controller 41 controls, for example, the head 12, the supply pump 34, the head valve 35, the supply valve 36, the branch valve 37, and the circulation valve 38.

The controller 41 may be configured as circuitry including: a, one or more processors that perform various processing according to computer programs; B, one or more dedicated hardware circuits, such as application-specific integrated circuits, that perform at least some of the various processing; or y, a combination of a and B. The processor includes a central processing unit (CPU) and memory, such as random access memory (RAM) or read-only memory (ROM). The memory stores program code or instructions configured to cause the CPU to perform processing. The memory, that is, a computer-readable medium, may be any type of readable medium that can be accessed by a general or dedicated computer.

The controller 41 controls the supply of liquid by controlling the supply pump 34 and the valves.

For example, the controller 41 supplies the liquid from the main tank 22 to the head 12 by controlling the supply pump 34 and valves. Specifically, the controller 41 opens the head valve 35 and the supply valve 36 and drives the supply pump 34 to supply the liquid from the main tank 22 to the head 12. In this case, the liquid flows from the main tank 22, passes the branch point P1 and the first connection point Q1 in this order, and then flows into the head 12.

For example, the controller 41 supplies the liquid from the main tank 22 to the sub tank 26 by controlling the supply pump 34 and valves. Specifically, the controller 41 opens the supply valve 36 and the circulation valve 38 and drives the supply pump 34 to supply the liquid from the main tank 22 to the sub tank 26. In this case, the liquid flows from the main tank 22, passes the branch point P1, the first connection point Q1, and the second connection point Q2 in this order, and then flows into the sub tank 26.

For example, the controller 41 supplies the liquid from the sub tank 26 to the head 12 by controlling the supply pump 34 and valves. Specifically, the controller 41 opens the head valve 35 and the branch valve 37 and drives the supply pump 34 to supply the liquid from the sub tank 26 to the head 12. In this case, the liquid flows from the sub tank 26, passes the second connection point Q2, the branch point P1, and the first connection point Q1 in this order, and then flows into the head 12.

For example, the controller 41 circulates the liquid contained in the sub tank 26 by controlling the supply pump 34 and valves. Specifically, the controller 41 opens the branch valve 37 and the circulation valve 38 and drives the supply pump 34. First, when the supply pump 34 draws the liquid, the liquid flows from the sub tank 26 into the supply pump 34. In this case, the liquid flows from the sub tank 26, passes the second connection point Q2 and the branch point P1 in this order, and then flows into the supply pump 34. Next, the supply pump 34 discharges the liquid to cause the liquid to flow through the circulation channel 33. The liquid flowing through the circulation channel 33 then flows through the branch channel 32 and returns to the sub tank 26. In this case, the liquid flows from the supply pump 34, passes the first connection point Q1 and the second connection point Q2 in this order, and then flows into the sub tank 26. By repeating the series of operations, the liquid contained in the sub tank 26 is agitated. When the supply pump 34 is a tube pump, the liquid circulates between the first connection point Q1 and the second connection point Q2 while the supply pump 34 is being driven.

Figure 2:
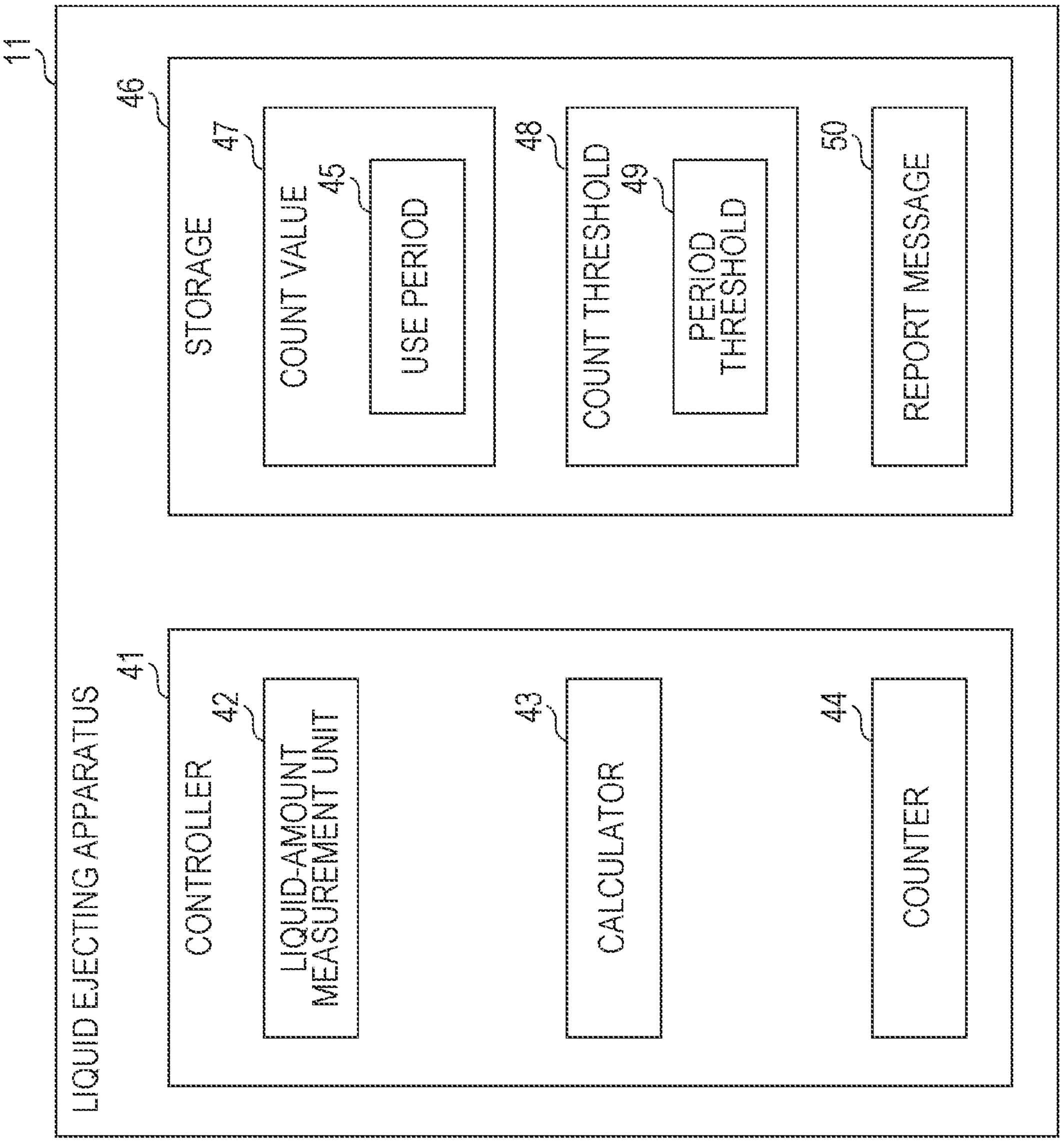
FIG. 2 is a block diagram illustrating an electrical configuration of a liquid ejecting apparatus.

As illustrated in FIG. 2, the controller 41 includes a liquid-amount measurement unit 42. The liquid-amount measurement unit 42 measures the amount of liquid that flows out of the main tank 22. The liquid-amount measurement unit 42 measures the amount of liquid supplied from the main tank 22 to the sub tank 26 and the amount of liquid supplied from the main tank 22 to the head 12. For example, the liquid-amount measurement unit 42 measures the amount of liquid flowing out of the main tank 22 in accordance with the number of times the supply pump 34 is driven (which is hereafter referred to as a "drive count").

The controller 41 includes a calculator 43. The calculator 43 calculates the remaining amount of liquid in the main tank 22 at the present time in accordance with the amount of liquid that has flowed out of the main tank 22. That is, the calculator 43 calculates the remaining amount of liquid in the main tank 22 at the present time in accordance with a value measured by the liquid-amount measurement unit 42. The calculator 43 calculates the remaining amount of liquid in the main tank 22 at the present time by subtracting the amount of liquid that has flowed out of the main tank 22 from the remaining amount of liquid indicated by remaining amount information, which is obtained by the controller 41 from the memory circuit 18 of the main tank 22 via the connector 23.

The controller 41 updates, via the connector 23, the remaining amount information stored in the memory circuit 18 of the main tank 22 in accordance with the amount of liquid that has flowed out of the main tank 22. That is, the controller 41 writes, to the memory circuit 18 of the main tank 22 via the connector 23, the remaining amount of liquid in the main tank 22 at the present time, which is calculated by the calculator 43, as the remaining amount information. As a result, the remaining amount information stored in the memory circuit 18 of the main tank 22 is updated. Thus, the controller 41 manages the remaining amount of liquid in the main tank 22. Unlike the remaining amount of liquid in the sub tank 26 that is directly detected by the detector 27, the remaining amount of liquid in the main tank 22 is indirectly detected by the controller 41.

The controller 41 performs an operational control based on the remaining amount information stored in the memory circuit 18 of the main tank 22. The operational control is, for example, a process of restraining the supply of the liquid.

For example, when the obtained remaining amount information indicates that the remaining amount of liquid is sufficient, the controller 41 permits the supply of liquid from the main tank 22 to the sub tank 26 or the head 12. When, for example, the obtained remaining amount information indicates that the remaining amount of liquid is zero or very small, the controller 41 restrains the supply of the liquid from the main tank 22.

The controller 41 may notify that the remaining amount of liquid is zero or very small when the obtained remaining amount information indicates that the remaining amount of liquid is zero or very small. For this purpose, for example, the controller 41 may display a message indicating that the remaining amount of liquid is zero or very small on a display screen of the liquid ejecting apparatus 11 or a display screen of a terminal coupled to the liquid ejecting apparatus 11.

When the remaining amount information obtained from the memory circuit 18 of the liquid container 14 indicates that the remaining amount of liquid is zero or very small, the controller 41 prevents the use of the liquid container 14. When the use of the liquid container 14 is prevented, the supply of the liquid from the liquid container 14 is restrained.

The controller 41 performs an operational control based on information detected by the detector 27. For example, when a detection result of the detector 27 indicates that the remaining amount of liquid in the sub tank 26 is sufficient, the controller 41 permits the supply of the liquid from the sub tank 26 to the head 12. For example, when a detection result of the detector 27 indicates that the remaining amount of liquid is zero or very small, the controller 41 restrains the supply of the liquid from the sub tank 26. For example, when a detection result of the detector 27 indicates that the remaining amount of liquid is zero or very small, the controller 41 supplies the liquid from the main tank 22 to the sub tank 26.

The controller 41 includes a counter 44. The counter 44 counts a use period 45. The use period 45 indicates the period of time for which the sub tank 26 attached to the second holder 25 has been used. For example, based on a detection result of the detector 27, the controller 41 determines that the second holder 25 is attached to the liquid container 14. When the liquid container 14 is attached to the second holder 25, the counter 44 starts counting the use period 45.

The use period 45 is, for example, a period of time that has elapsed after the liquid container 14 used as the sub tank 26 is attached to the second holder 25, that is, a post-attachment elapsed time. The use period 45 may also indicate the number of times the liquid is supplied from the main tank 22 to the sub tank 26, that is, a supply count. For example, the use period 45 is reset when the sub tank 26 is replaced. The counter 44 may also count the time elapsed from when the liquid is supplied from the main tank 22 to the sub tank 26, that is, a supply elapsed time.

The liquid ejecting apparatus 11 includes storage 46. The storage 46 is, for example, non-volatile memory. The storage 46 may be memory such as a ROM or a RAM included in the controller 41.

The storage 46 stores count values 47. The count values 47 are values counted by the counter 44. That is, the storage 46 stores the period of time for which the sub tank 26 attached to the second holder 25 has been used, that is, the use period 45. Accordingly, the count values 47 include the use period 45. The count values 47 may include the supply elapsed time in addition to the use period 45.

The storage 46 stores count thresholds 48. The count thresholds 48 are thresholds of the count values 47. The count thresholds 48 include a period threshold 49. The period threshold 49 is a threshold of the use period 45. The period threshold 49 is, for example, a threshold of the post-attachment elapsed time. The period threshold 49 may also be a threshold of the supply count. The count thresholds 48 may include a threshold of the supply elapsed time in addition to the period threshold 49. The count thresholds 48 are stored in the storage 46 in advance.

The controller 41 compares the count values 47 with the count thresholds 48. For example, the controller 41 compares the use period 45 with the period threshold 49. When the use period 45 exceeds the period threshold 49, the controller 41 notifies to that effect. That is, when the use period 45 exceeds a predetermined period, the controller 41 notifies that the use period 45 has exceeded the predetermined period. In this example, when the post-attachment elapsed time exceeds a threshold, the controller 41 notifies that the post-attachment elapsed time has exceeded the threshold. The controller 41 may also compare the supply count with its threshold. In this case, when the supply count exceeds the threshold, the controller 41 notifies to that effect. The controller 41 may also compare the supply elapsed time with its threshold. In this case, when the supply elapsed time exceeds the threshold, the controller 41 notifies to that effect.

The storage 46 stores a report message 50 as a notification message. The report message 50 is a message for informing the user. For example, when the remaining amount of liquid in the main tank 22 becomes zero or very small, the controller 41 displays the report message 50 on a screen. For example, when the use period 45 exceeds a predetermined period, that is, the period threshold 49, the controller 41 displays the report message 50 on a screen. The controller 41 informs the user of information indicated by the report message 50 by displaying the report message 50 on a display screen.

The controller 41 changes the information in the report message 50 depending on the cause of the reporting. The report message 50 contains, for example, information requesting replacement of the liquid container 14. The report message 50 may contain information requesting replacement of the main tank 22. The report message 50 may contain information requesting replacement of the sub tank 26.

Examples of information requesting replacement of the liquid container 14 include:

1. Information requesting that the liquid container 14 being used as the main tank 22 and the liquid container 14 being used as the sub tank 26 be exchanged with each other.
2. Information requesting that the main tank 22 be replaced with a new liquid container 14, that the sub tank 26 be replaced with the liquid container 14 previously used as the main tank 22, and that the liquid container 14 previously used as the sub tank 26 be discarded.
3. Information requesting that the sub tank 26 be replaced with a new liquid container 14 and that the main tank 22 be replaced with the liquid container 14 previously used as the sub tank 26.
4. Information requesting that the sub tank 26 be replaced with a new liquid container 14.

Thus, the information requesting that the liquid container 14 be replaced may include a request to reuse the liquid container 14.

Next, reuse of the liquid container 14 is described. First, a case in which the liquid container 14 previously used as the main tank 22 is reused as the sub tank 26 is described.

The main tank 22 is used such that the liquid flows out of the main tank 22 but does not flow into the main tank 22. Therefore, the remaining amount of liquid in the main tank 22 only decreases. In the case of the sub tank 26, the liquid flows out of and into the sub tank 26. Therefore, the remaining amount of liquid in the sub tank 26 increases and decreases. For this reason, the sub tank 26 is more likely to be used for a longer time than the main tank 22. Accordingly, the sub tank 26 is more likely to degrade than the main tank 22.

The main tank 22 is replaced in a shorter time compared with the sub tank 26. Therefore, the main tank 22 is less likely to degrade. Accordingly, the liquid container 14 previously used as the main tank 22 can be reused as the sub tank 26.

Consider a case in which the liquid container 14, which has been used as the main tank 22 and has run out of the liquid, is reused as the sub tank 26. In this case, the remaining amount information stored in the memory circuit 18 of the liquid container 14 to be reused as the sub tank 26 indicates that the remaining amount of liquid is zero or very small. Therefore, when performing an operational control based on the remaining amount information stored in the memory circuit 18 of the liquid container 14 attached to the second holder 25, the controller 41 restrains the supply of the liquid from the sub tank 26. That is, the use of the sub tank 26 is prevented.

In contrast, the controller 41 of this example does not perform an operational control based on the remaining amount information stored in the memory circuit 18 of the liquid container 14 attached to the second holder 25. That is, the controller 41 does not operate based on the remaining amount information stored in the memory circuit 18 of the liquid container 14 attached to the second holder 25. Specifically, the controller 41 does not restrain the supply of the liquid from the sub tank 26 to the head 12 in accordance with the remaining amount information stored in the memory circuit 18 of the sub tank 26. In other words, the controller 41 does not prevent the use of the sub tank 26 in accordance with the remaining amount information stored in the memory circuit 18 of the sub tank 26.

When the liquid container 14, which is the main tank 22 previously attached to the first holder 21, is attached to the second holder 25, the controller 41 does not perform an operational control based on the remaining amount information stored in the memory circuit 18 of the liquid container 14. This makes it possible to use, as the sub tank 26, the liquid container 14 previously used as the main tank 22.

In this example, the second holder 25 does not include the connector 23. That is, in this example, the controller 41 does not obtain the remaining amount information from the memory circuit 18 of the liquid container 14 attached to the second holder 25. Accordingly, the controller 41 does not perform an operational control based on the remaining amount information stored in the memory circuit 18 of the liquid container 14 attached to the second holder 25.

The second holder 25 may also include the connector 23, similarly to the first holder 21. The second holder 25 may include the connector 23. In that case, it suffices that the controller 41 does not obtain the remaining amount information from the memory circuit 18 of the liquid container 14 attached to the second holder 25.

When the second holder 25 includes the connector 23, the controller 41 may also be configured to obtain, via the connector 23, the remaining amount information from the memory circuit 18 of the liquid container 14 attached to the second holder 25. Even this configuration may be employed as long as the controller 41 does not perform an operational control based on the remaining amount information stored in the memory circuit 18 of the liquid container 14 attached to the second holder 25.

When the second holder 25 includes the connector 23, the controller 41 may be configured to update, via the connector 23, the remaining amount information stored in the memory circuit 18 of the liquid container 14 attached to the second holder 25. For example, the controller 41 may update the remaining amount information in the memory circuit 18 of the sub tank 26 in accordance with a detection result of the detector 27.

If the controller 41 indirectly detects the remaining amount of liquid in the sub tank 26 in accordance with the drive count of the supply pump 34 as in the case of the main tank 22, the controller 41 may not be able to correctly determine the remaining amount of liquid in the sub tank 26. This is because the difference between the remaining amount of liquid determined based on the drive count of the supply pump 34 and the actual remaining amount of liquid becomes large. Because the sub tank 26 is used for a longer time than the main tank 22, this difference tends to increase. Also, because the liquid flows into and out of the sub tank 26, this difference tends to increase. Therefore, it is preferable to directly detect the remaining amount of liquid in the sub tank 26 by using the detector 27.

Next, a case in which the liquid container 14 previously used as the sub tank 26 is used as the main tank 22 is described.

When the liquid container 14 previously used as the sub tank 26 is not degraded, the liquid container 14 can be reused as the main tank 22. In this case, before reusing the liquid container 14 as the main tank 22, the remaining amount of liquid indicated by the remaining amount information stored in the memory circuit 18 of the sub tank 26 needs to be matched with the actual remaining amount of liquid. Here, when the remaining amount of liquid indicated by the remaining amount information stored in the memory circuit 18 of the liquid container 14 previously used as the sub tank 26 is zero or very small, the liquid container 14 cannot be reused as the main tank 22.

When the liquid container 14, which is the sub tank 26 previously attached to the second holder 25, is attached to the first holder 21, the controller 41 performs an operational control based on the remaining amount information stored in the memory circuit 18 of the liquid container 14. When the remaining amount of liquid indicated by the remaining amount information stored in the memory circuit 18 of the liquid container 14 matches the actual remaining amount of liquid, the liquid container 14 can be used as the main tank 22.

When a new liquid container 14 has been used as the sub tank 26, the remaining amount information stored in the memory circuit 18 of the liquid container 14 indicates that the remaining amount of liquid is maximum. Therefore, in this case, the liquid is supplied from the main tank 22 to the sub tank 26 so that the remaining amount of liquid in the sub tank 26 becomes maximum. With this process, the liquid container 14 previously used as the sub tank 26 can be reused as the main tank 22.

When a reused liquid container 14 has been used as the sub tank 26, the remaining amount information stored in the memory circuit 18 of the liquid container 14 indicates that the remaining amount of liquid is not maximum. That is, in this case, the liquid container 14 is reused again. In this case, the second holder 25 preferably includes the connector 23. The controller 41 supplies the liquid from the main tank 22 to the sub tank 26 or from the sub tank 26 to the head 12 so that the remaining amount of liquid indicated by the remaining amount information stored in the memory circuit 18 of the sub tank 26 matches the actual remaining amount of liquid contained in the sub tank 26. With this process, the liquid container 14 previously used as the sub tank 26 can be reused as the main tank 22.

When the controller 41 updates the remaining amount information stored in the memory circuit 18 of the liquid container 14 attached to the second holder 25, the remaining amount of liquid indicated by the remaining amount information stored in the memory circuit 18 of the sub tank 26 matches the actual remaining amount of liquid contained in the sub tank 26. Therefore, also in this case, the liquid container 14 previously used as the sub tank 26 can be reused as the main tank 22.

Next, an example of a supply operation performed by the controller 41 is described.

As shown in FIG. 3, when the liquid remains in the main tank 22 and the sub tank 26 and an elapsed time is less than or equal to a predetermined time, the controller 41 supplies the liquid from the main tank 22 to the head 12. In this case, the liquid in the main tank 22 is consumed. The elapsed time indicates, for example, the post-attachment elapsed time or the supply elapsed time. The predetermined time is less than the predetermined period, that is, the period threshold 49.

When the liquid remains in the main tank 22 and the sub tank 26 and the elapsed time is greater than the predetermined time, the controller 41 supplies the liquid from the sub tank 26 to the head 12. This is to prevent the degradation of the liquid contained in the sub tank 26.

When the liquid remains in the main tank 22 and the remaining amount of liquid in the sub tank 26 is zero or very small, the controller 41 supplies the liquid from the main tank 22 to the head 12 or from the main tank 22 to the sub tank 26. When it is necessary to supply the liquid to the head 12, the controller 41 supplies the liquid from the main tank 22 to the head 12. That is, when determining that no liquid remains in the sub tank 26, the controller 41 supplies the liquid from the main tank 22 to the head 12. This makes it possible to continue printing using the liquid in the main tank 22 even when the sub tank 26 runs out of the liquid. When it is not necessary to supply the liquid to the head 12, the controller 41 supplies the liquid from the main tank 22 to the sub tank 26. The controller 41 determines that no liquid remains in the sub tank 26 also when the liquid container 14 is not attached to the second holder 25.

When the remaining amount of liquid in the main tank 22 is zero or very small and the liquid remains in the sub tank 26, the controller 41 supplies the liquid from the sub tank 26 to the head 12. In this case, the controller 41 requests replacement of the main tank 22. That is, when determining that no liquid remains in the main tank 22, the controller 41 supplies the liquid from the sub tank 26 to the head 12. This makes it possible to continue printing using the liquid in the sub tank 26 even when the main tank 22 runs out of the liquid. The controller 41 determines that no liquid remains in the main tank 22 also when the liquid container 14 is not attached to the first holder 21.

When the main tank 22 is replaced, a liquid container 14 containing a small amount of liquid may be attached to the first holder 21. When the liquid container 14 is attached to the first holder 21, the controller 41 obtains the remaining amount information stored in the memory circuit 18 of the liquid container 14. When the remaining amount of liquid indicated by the obtained remaining amount information is small, the controller 41 supplies the liquid from the main tank 22 to the sub tank 26. Thus, when the remaining amount of liquid in the liquid container 14 attached to the first holder 21 is small, the controller 41 preferentially uses up the liquid contained in the liquid container 14.

In the example shown in FIG. 3, the controller 41 preferentially uses the liquid in the main tank 22. When the liquid in the sub tank 26 is likely to degrade, the controller 41 switches to and uses the sub tank 26.

For example, the controller 41 may preferentially use the liquid in the sub tank 26. When no liquid remains in the sub tank 26, the controller 41 may switch to and use the main tank 22.

For example, the controller 41 may perform control to supply the liquid from the main tank 22 to the sub tank 26 and then supply the liquid from the sub tank 26 to the head 12. That is, the controller 41 may not necessarily supply the liquid directly from the main tank 22 to the head 12. In this case, because the liquid flows sequentially from the main tank 22 to the sub tank 26 and then from the sub tank 26 to the head 12, it becomes easier to manage the remaining amount of liquid.

Next, operations and effects of the above embodiment are described.

(1) The controller 41 performs an operational control based on the remaining amount information stored in the memory circuit 18 of the main tank 22 and does not perform an operational control based on the remaining amount information stored in the memory circuit 18 of the sub tank 26.

When replacing the sub tank 26, the liquid container 14 previously used as the main tank 22 may be reused as the sub tank 26. For example, the liquid container 14 that has been used as the main tank 22 and has run out of the liquid may be reused as the sub tank 26. In this case, the remaining amount information stored in the memory circuit 18 of the liquid container 14 to be reused indicates that the remaining amount of liquid is zero or very small. Accordingly, if the controller 41 performs an operational control based on the remaining amount information stored in the memory circuit 18 of the sub tank 26, it is not possible to supply the liquid from the sub tank 26 to the head 12.

With the above configuration, because the controller 41 does not perform an operational control based on the remaining amount information stored in the memory circuit 18 of the sub tank 26, the liquid container 14 previously used as the main tank 22 can be used as the sub tank 26. This reduces the risk of degradation of the sub tank 26. This in turn reduces the risk of a failure of the liquid ejecting apparatus 11.

(2) When the liquid container 14, which has been used as the main tank 22 and attached to the first holder 21, is attached to the second holder 25, the controller 41 does not perform an operational control based on the remaining amount information stored in the memory circuit 18 of the liquid container 14. With the above configuration, the main tank 22 can be used as the sub tank 26 even when the remaining amount of liquid indicated by the remaining amount information stored in the memory circuit 18 of the liquid container 14 is zero or very small.

(3) When the liquid container 14, which is the sub tank 26 previously attached to the second holder 25, is attached to the first holder 21, the controller 41 performs an operational control based on the remaining amount information stored in the memory circuit 18 of the liquid container 14.

With the above configuration, the liquid container 14 previously used as the sub tank 26 can be used as the main tank 22 when the remaining amount of liquid indicated by the remaining amount information stored in the memory circuit 18 of the liquid container 14 previously used as the sub tank 26 matches the actual remaining amount of liquid.

(4) The liquid ejecting apparatus 11 includes the storage 46 that stores the use period 45 of the sub tank 26 attached to the second holder 25. When the use period 45 stored in the storage 46 exceeds a predetermined period, the controller 41 notifies that the use period 45 has exceeded the predetermined period.

When the sub tank 26 is used for a long time, the sub tank 26 degrades. With the above configuration, the controller 41 can notify the possibility of degradation of the sub tank 26. For example, the user can replace the sub tank 26 by taking into account the notification.

(5) A notification that the use period 45 has exceeded the predetermined period includes information that requests replacement of the sub tank 26. The above configuration makes it possible to prompt the user to replace the sub tank 26 that has possibly degraded.

(6) The connector 23 includes the terminal 24 that comes into contact with the memory circuit 18 of the main tank 22. The controller 41 updates the remaining amount information in the memory circuit 18 that is in contact with the terminal 24. Compared with a case in which the connector 23 is coupled to the memory circuit 18 in a contactless manner, the above configuration makes the connection between the memory circuit 18 and the connector 23 more stable.

(7) The liquid ejecting apparatus 11 includes the detector 27 that detects the remaining amount of liquid in the sub tank 26. The controller 41 performs an operational control based on information detected by the detector 27. With the above configuration, the controller 41 can determine the remaining amount of liquid in the sub tank 26 by using the detector 27. For example, this makes it possible to supply the liquid from the main tank 22 to the sub tank 26 at a timing when the remaining amount of liquid in the sub tank 26 becomes zero or very small. That is, the above configuration makes it possible to supply the liquid to the sub tank 26 at an appropriate timing.

(8) The controller 41 supplies the liquid from the main tank 22 to the head 12 when it is determined that no liquid remains in the sub tank 26 and supplies the liquid from the sub tank 26 to the head 12 when it is determined that no liquid remains in the main tank 22.

With the above configuration, even when one of the main tank 22 and the sub tank 26 runs out of the liquid, the liquid can be supplied from the other one of the main tank 22 and the sub tank 26 to the head 12. This reduces the downtime of the liquid ejecting apparatus 11.

The present embodiment may be varied as described below. The present embodiment and variations described below may be combined with each other as long as they do not technically conflict with each other.

- The liquid-amount measurement unit 42 may measure the amount of liquid flowing out of the main tank 22 by using, for example, a flow meter disposed in the supply channel 31. The liquid-amount measurement unit 42 may measure the amount of liquid flowing out of the main tank 22 in accordance with the amount of liquid ejected by the head 12.
- The first holder 21 and the second holder 25 may be positioned in series with the head 12. For example, the second holder 25 may be positioned in the supply channel 31 between the first holder 21 and the head 12. In this case, the controller 41 sequentially supplies the liquid from the main tank 22 to the sub tank 26 and then from the sub tank 26 to the head 12.
- The liquid ejected by the head 12 is not limited to ink and may be, for example, a fluid formed by dispersing or mixing particles of a functional material into a liquid. For example, the head 12 may eject a fluid in which a material, such as an electrode material or a pixel material, which is used in the manufacture of, for example, a liquid crystal display, an electroluminescence display, and a surface emitting display, is dispersed or dissolved.

Below, technical ideas and their effects identified from the above embodiment and variations are described.

(A) A liquid ejecting apparatus includes a head that ejects a liquid, a first holder to which a main tank is attached, a second holder to which a sub tank is attached, a supply channel coupled to the head and the first holder, a branch channel that branches off at an intermediate point in the supply channel and that is coupled to the second holder, and a controller. Each of the main tank and the sub tank is a liquid container including a container that contains a liquid and a memory circuit that stores remaining amount information of the liquid. The first holder includes a connector coupled to the memory circuit of the main tank. The controller updates, via the connector, the remaining amount information stored in the memory circuit of the main tank in accordance with the amount of the liquid flowed out of the main tank, performs an operational control based on the remaining amount information stored in the memory circuit of the main tank, and does not perform the operational control based on the remaining amount information stored in the memory circuit of the sub tank.

The liquid flows out of the main tank but does not flow into the main tank. Therefore, when the remaining amount of liquid in the main tank becomes zero or very small, the main tank is replaced. In contrast, the liquid flows out of and into the sub tank. Therefore, even when the remaining amount of liquid in the sub tank becomes zero or very small, the sub tank can be continuously used by supplying the liquid from the main tank into the sub tank. For this reason, the sub tank tends to be used for a longer time than the main tank. Accordingly, compared with the main tank, the sub tank is more likely to degrade. The sub tank needs to be replaced before the sub tank degrades.

When replacing the sub tank, the liquid container previously used as the main tank may be reused as the sub tank. For example, the liquid container that has been used as the main tank and has run out of the liquid may be reused as the sub tank. In this case, the remaining amount information stored in the memory circuit of the liquid container to be reused indicates that the remaining amount of liquid is zero or very small. Accordingly, if the controller performs an operational control based on the remaining amount information stored in the memory circuit of the sub tank, it is not possible to supply the liquid from the sub tank to the head.

With the above configuration, because the controller does not perform an operational control based on the remaining amount information stored in the memory circuit of the sub tank, the liquid container previously used as the main tank can be used as the sub tank. This reduces the risk of degradation of the sub tank. This in turn reduces the risk of a failure of the liquid ejecting apparatus.

(B) In the liquid ejecting apparatus, when the liquid container, which is the main tank previously attached to the first holder, is attached to the second holder, the controller may not necessarily perform the operational control based on the remaining amount information stored in the memory circuit of the liquid container. With the above configuration, the main tank can be used as the sub tank even when the remaining amount of liquid indicated by the remaining amount information stored in the memory circuit of the liquid container is zero or very small.

(C) In the liquid ejecting apparatus, when the liquid container, which is the sub tank previously attached to the second holder, is attached to the first holder, the controller may perform the operational control based on the remaining amount information stored in the memory circuit of the liquid container.

The liquid flows into the sub tank. Therefore, it is possible to refill the sub tank with the liquid by supplying the liquid from the main tank to the sub tank. Accordingly, a sub tank still containing the liquid may be reused as the main tank. With the above configuration, the liquid container previously used as the sub tank can be used as the main tank when the remaining amount of liquid indicated by the remaining amount information stored in the memory circuit of the liquid container previously used as the sub tank matches the actual remaining amount of liquid.

(D) The liquid ejecting apparatus may further include a storage that stores a use period of the sub tank attached to the second holder. When the use period stored in the storage exceeds a predetermined period, the controller may notify that the use period exceeded the predetermined period.

When the sub tank is used for a long time, the sub tank degrades. With the above configuration, the controller can notify the possibility of degradation of the sub tank. For example, the user can replace the sub tank by taking into account the notification.

(E) In the liquid ejecting apparatus, the notification may include information that requests replacement of the sub tank.

The above configuration makes it possible to prompt the user to replace the sub tank that has possibly degraded.

(F) In the liquid ejecting apparatus, the connector may include a terminal that comes into contact with the memory circuit of the main tank, and the controller may update the remaining amount information in the memory circuit that is in contact with the terminal. Compared with a case in which the connector is coupled to the memory circuit in a contactless manner, the above configuration makes the connection between the memory circuit and the connector more stable.

(G) The liquid ejecting apparatus may further include a detector that detects the remaining amount of the liquid in the sub tank, and the controller may perform the operational control based on the remaining amount of the liquid detected by the detector.

With the above configuration, the controller can determine the remaining amount of liquid in the sub tank by using the detector. For example, this makes it possible to supply the liquid from the main tank to the sub tank at a timing when the remaining amount of liquid in the sub tank becomes zero or very small. That is, the above configuration makes it possible to supply the liquid to the sub tank at an appropriate timing.

(H) In the liquid ejecting apparatus, the controller may supply the liquid from the main tank to the head when determining that the liquid does not remain in the sub tank and may supply the liquid from the sub tank to the head when determining that the liquid does not remain in the main tank.

With the above configuration, even when one of the main tank and the sub tank runs out of the liquid, the liquid can be supplied from the other one of the main tank and the sub tank to the head. This reduces the downtime of the liquid ejecting apparatus.

What is claimed is:

1. A liquid ejecting apparatus comprising:
- a head that ejects a liquid;
- a first holder to which a main tank is attached;
- a second holder to which a sub tank is attached;
- a supply channel coupled to the head and the first holder;
- a branch channel that branches off at an intermediate point in the supply channel and that is coupled to the second holder;
- a storage that stores a use period of the sub tank attached to the second holder; and
- a controller, wherein
- each of the main tank and the sub tank is a liquid container including a container that contains a liquid and a memory circuit that stores remaining amount information of the liquid;
- the first holder includes a connector coupled to the memory circuit of the main tank; and
- the controller
- updates, via the connector, the remaining amount information stored in the memory circuit of the main tank in accordance with an amount of the liquid flowed out of the main tank,
- performs an operational control based on the remaining amount information stored in the memory circuit of the main tank, and
- does not perform the operational control based on the remaining amount information stored in the memory circuit of the sub tank,
- wherein when the use period stored in the storage exceeds a predetermined period, the controller notifies that the use period exceeded the predetermined period.

2. The liquid ejecting apparatus according to claim 1, wherein when the liquid container, which is the main tank previously attached to the first holder, is attached to the second holder, the controller does not perform the operational control based on the remaining amount information stored in the memory circuit of the liquid container.

3. The liquid ejecting apparatus according to claim 1, wherein when the liquid container, which is the sub tank previously attached to the second holder, is attached to the first holder, the controller performs the operational control based on the remaining amount information stored in the memory circuit of the liquid container.

4. The liquid ejecting apparatus according to claim 1, wherein the notification includes information that requests replacement of the sub tank.

5. The liquid ejecting apparatus according to claim 1, wherein
- the connector includes a terminal that comes into contact with the memory circuit of the main tank; and
- the controller updates the remaining amount information in the memory circuit that is in contact with the terminal.

6. The liquid ejecting apparatus according to claim 1, further comprising:
- a detector that detects a remaining amount of the liquid in the sub tank, wherein
- the controller performs the operational control based on the remaining amount of the liquid detected by the detector.

7. A liquid ejecting apparatus comprising:
- a head that ejects a liquid;
- a first holder to which a main tank is attached;
- a second holder to which a sub tank is attached;
- a supply channel coupled to the head and the first holder;
- a branch channel that branches off at an intermediate point in the supply channel and that is coupled to the second holder; and
- a controller, wherein
- each of the main tank and the sub tank is a liquid container including a container that contains a liquid and a memory circuit that stores remaining amount information of the liquid;
- the first holder includes a connecter coupled to the memory circuit of the main tank; and
- the controller
- updates, via the connector, the remaining amount information stored in the memory circuit of the main tank in accordance with an amount of the liquid flowed out of the main tank,
- performs an operational control based on the remaining amount information stored in the memory circuit of the main tank,
- does not perform the operational control based on the remaining amount information stored in the memory circuit of the sub tank,
- supplies the liquid from the main tank to the head when determining that the liquid does not remain in the sub tank and
- supplies the liquid from the sub tank to the head when determining that the liquid does not remain in the main tank.

* * * * *